US007260097B2

(12) United States Patent
Casey (10) Patent No.: US 7,260,097 B2
(45) Date of Patent: Aug. 21, 2007

(54) LABEL CONTROL METHOD AND APPARATUS FOR VIRTUAL PRIVATE LAN SEGMENT NETWORKS

(75) Inventor: Liam Casey, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1059 days.

(21) Appl. No.: 10/265,621

(22) Filed: Oct. 8, 2002

(65) Prior Publication Data

US 2003/0142674 A1    Jul. 31, 2003

Related U.S. Application Data

(60) Provisional application No. 60/352,888, filed on Jan. 30, 2002.

(51) Int. Cl.
*H04L 12/28* (2006.01)
(52) U.S. Cl. ........................ 370/392; 370/401
(58) Field of Classification Search ................ 370/408, 370/238, 236, 401, 393, 389; 709/249
See application file for complete search history.

(56) References Cited

U.S. PATENT DOCUMENTS

2003/0018820 A1* 1/2003 Ould-Brahim et al. ...... 709/249
2003/0026209 A1* 2/2003 Katz .......................... 370/238

* cited by examiner

*Primary Examiner*—Chau Nguyen
*Assistant Examiner*—Dargaye Churnet (57) ABSTRACT

A network can be organized for providing virtual private LAN segment (VPLS) services to customers into a network core and an associated number of logical provider edges. Each logical provider edge is partitioned into a plurality of Edge-PEs and a Core-PE. Customers connect to the Edge-PE. The Edge-PE maintains a context (a virtual bridge) for each customer VPLS it serves, VPLS service is realized by a full mesh of so called virtual circuit (VC) tunnels between virtual bridge ports. Each VC tunnel is identified by 3 VC labels in each direction, the first label is used in the encapsulation of customer traffic from the ingress Edge-PE to the ingress Core-PE, the second from ingress Core-PE to egress Core-PE and the third from egress Core-PE to Egress Edge-PE. The mechanisms for the allocation of the label values to and how the label values are used provide a realization of VPLS service that is scalable and easy to administer.

22 Claims, 6 Drawing Sheets

LABEL CONTROL METHOD AND APPARATUS FOR VIRTUAL PRIVATE LAN SEGMENT NETWORKS

FIELD OF THE INVENTION

The present invention relates to virtual private networks, and is particularly concerned with MPLS label control for distributed virtual private LAN segments.

BACKGROUND OF THE INVENTION

Ethernet has emerged as the standard of choice for local area networks (LAN). With speeds of 10 Mbps, 100 Mbps, 1 Gbps and soon 10 Gbps, Ethernet capacity has grown to meet the need for increased network capacities. Consequently, there is considerable interest by operators of metropolitan and backbone networks in offering Ethernet based virtual private network services to enterprises to extend their local area Ethernets over the wide area.

A Virtual Private LAN Segment (VPLS) is a type of virtual private network in which the packets steered to a destination between VPN sites are Ethernet packets. VPLS service is also known as transparent LAN service (TLS).

At the same time operators of public data networks can gain capital and operating benefits by consolidating all of the services they offer onto one type of network core. Increasingly that core network is planned to be an MPLS network. To offer a VPLS service to multiple customers involves transporting the customers' Ethernet packets over an MPLS core network.

Despite the inherent elegance of this conceptual network, actual implementation of such networks must devise physical and/or logical arrangements to insure optimal performance, scalability, and operability. One approach to the scaling challenges is to distribute the VPLS service mechanisms over two sorts of platform such as is proposed in the Logical Provider Edge. Herein these two platforms are called the Edge-PE and the Core-PE.

One such distributed functionality approach is Kompella's DTLS solution proposed in an Internet draft. However this solution requires a network wide numbering of VPN sites. This proposal therefore has an administrative burden of having to insure a unique VPN site ID for each instance of each VPN. This may require network administrators to put a limit on the number of sites that can participate in the VPN.

Scaling is another issue associated with Kompella's proposal. In DTLS only one MPLS label space can be used for identifying the tunnels between all Edge-PE of each VPLS.

Another distributed functionality approach for VPLS service realization is a proposal known as Hierarchical VPLS. It has the shortcoming of a requirement for the Core-PE to learn all of the customer MAC addresses of all of the VPN that its subtending Edge-PE server. In large-scale deployments, this may prove to be too many MAC addresses for a Core-PE to learn.

SUMMARY OF THE INVENTION

An object of the present invention is to provide an improved label control method and apparatus for virtual private networks.

Accordingly the present invention provides label control method and apparatus for distributed virtual private LAN segments.

The present invention provides method and apparatus for the operation of the logical provider edge network organization.

A method of providing virtual private network services in a network organized into a network core and a plurality of logical provider edges, each logical provider edge being partitioned into a plurality of Edge-PEs and a Core-PE, the method comprising the steps of: establishing a first tunnel between a first Edge-PE and a first Core-PE; establishing a second tunnel between the first Core-PE and a second Core-PE; and establishing a third tunnel between the second Core-PE and a second Edge-PE.

BRIEF DESCRIPTION OF THE DRAWINGS

The present invention will be further understood from the following detailed description with reference to the drawings in which.

DETAILED DESCRIPTION OF THE PREFERRED EMBODIMENT

Figure 1:
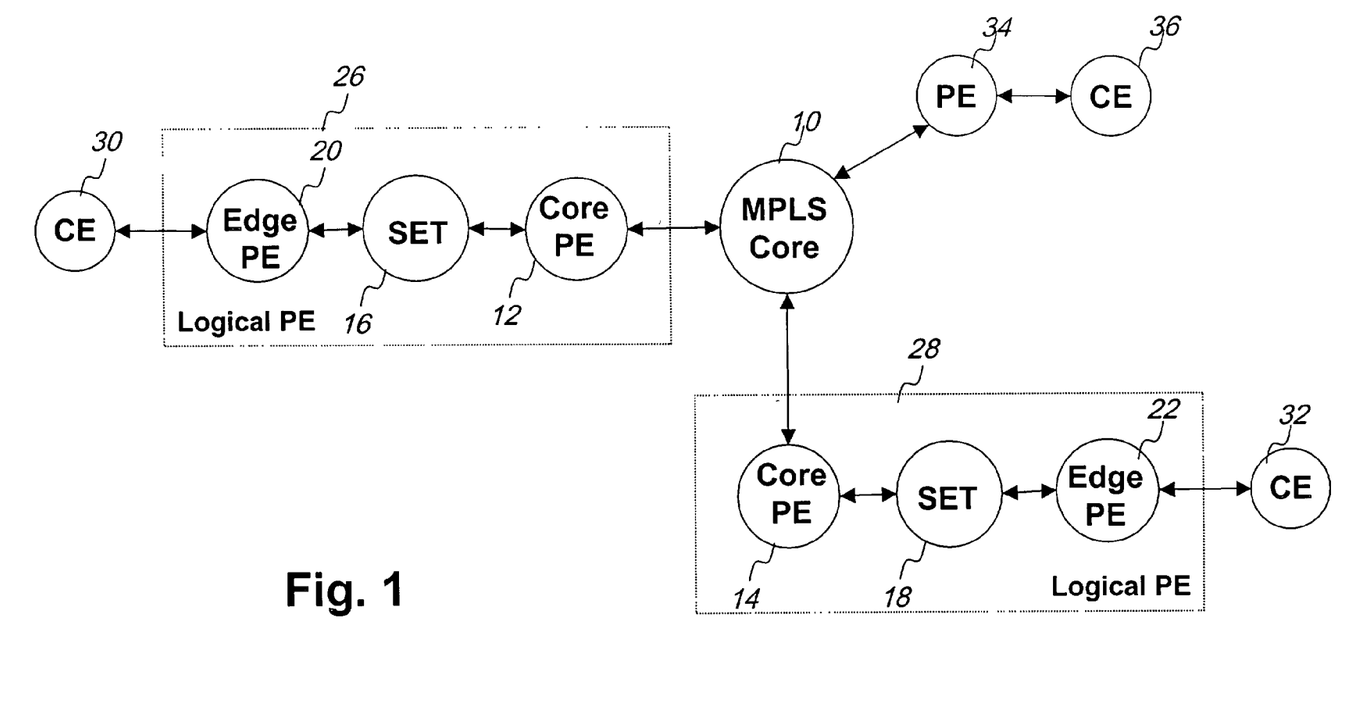
FIG. 1 schematically illustrates a network for the purpose of introducing network topology and terminology associated with embodiments of the present invention.

Referring to FIG. 1 there is illustrated, a network for the purpose of introducing network topology and terminology associated with embodiments of the present invention. The network entities, shown in FIG. 1, include a multi-protocol label switching (MPLS) core 10, core provider edges (Core-PEs) nodes 12 and 14, switched Ethernet transport (SET) networks 16 and 18, Edge-PEs 20 and 22. A logical PE 26 is shown as a Core-PE 12, SET 16 and Edge-PE 20 and a logical PE 28 is shown as a Core-PE 14, SET 18 and Edge-PE 22.

The logical provider edge (LPE) provides a way to organize network components in a hierarchy in order to deliver virtual private LAN segment (VPLS) service in a scalable fashion. The logical provider edge (LPE) is described in a co-pending application claiming priority from U.S. provisional application 60/304,904.

The logical PE 26 and 28 includes provider edge device functions and provider edge (PE) core device functions interconnected by a Layer 2 (L2) network (SET 16 and 18) for providing services to customers, represented by customer edge devices CE 30 and 32, respectively. The provider edge (PE) 34 represents the case where the functions of both Edge-PE and Core-PE are collapsed into a single device for serving customer edge device CE 36 straight into the MPLS core 10.

A LPE includes a Core-PE and an Edge-PE. A Core-PE is a device the device through which traffic of a switched Ethernet transport (SET) passes on its way to a core network. The Edge-PE is a device through which traffic from a customer edge (CE) device passes in order to access the SET. The CE device is the device through which traffic of a VPN at a particular site passes on its way to other sites of a VPN. A CE device thus represents a site of a VPN. The switched Ethernet transport (SET) provides layer 2 transport between a plurality of Edge-PE and a Core-PE.

Figure 2:
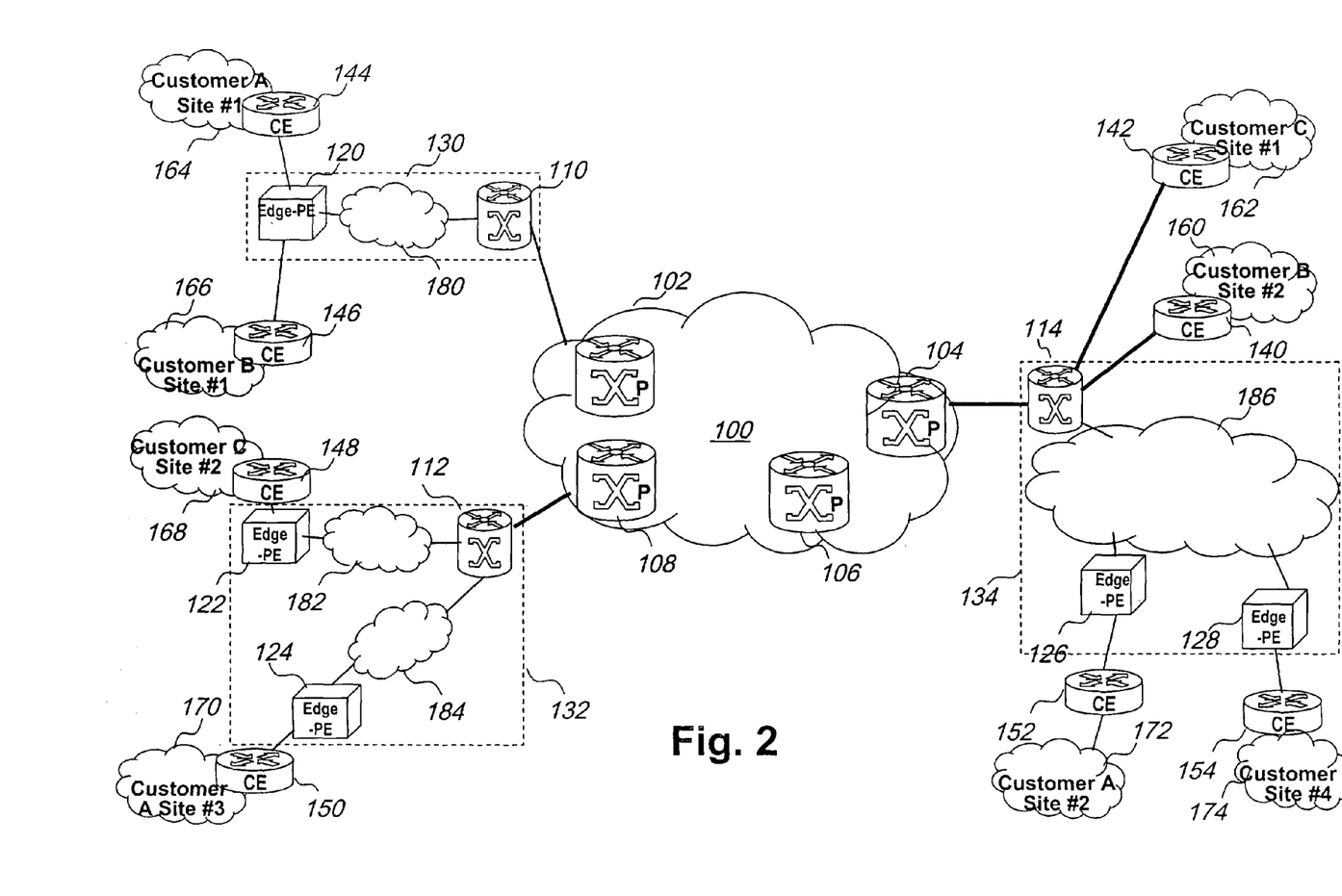
FIG. 2 illustrates a network reference model including a plurality of instances of logical PE associated with an embodiment of the present invention.

Referring to FIG. 2 there is provided a network reference model including a plurality of instances of logical PE associated with an embodiment of the present invention. The network reference model includes a core or backbone network as represented by 100 and a plurality of provider internal devices 102, 104, 106, 108. In one embodiment of the present invention this core network 100 is an MPLS network and the provider internal devices are label switch routers (LSRs). Those skilled in the art will recognize that the present invention can be embodied with any type of core network that permits the encapsulation of customer packets and where such encapsulation includes a field that can be identified as a virtual circuit label.

Connected to the backbone are a plurality of logical provider edges (LPE) 130, 132 and 134. The LPE organization ties together a group of Edge-PEs and one, or a small number, of Core-PEs by interconnecting them with one or more networks. Devices 110 and, 112, represent the Core-PE functions of LPEs 130 and 132 respectively while device 114 performs both the Core-PE function for LPE 134 and acts as a complete (non distributed) PE for the customer edges (CE) 140 and 142. The PE edge/core devices 110, 112 and 114 are connected by networks 180, 182, 184, and 184 to Edge-PE devices 120, 122, 124, 126, and 128. The logical PE 130 depicted for Core-PE devices 110 has one network 180 connecting device 110 to the Edge-PE 120.

Similarly, the logical PE 132 depicted for Core-PE device 112 has one network 182 connected Core-PE device 112 to PE-Edge 122. Finally, the logical PE 134 depicted for Core-PE device 114 has a ring network 184 connecting the Core-PE device 114 to the PE-Edge 124.

Embodiments of the invention include any and all arrangements of components in the LPE.

In one embodiment of the present invention the network connecting the Edge-PEs to the Core PE is a switched Ethernet transport (SET) network. Instances of SETs include, but are not restricted to, a resilient packet ring (RPR) as defined by the IEEE 802.17 committee and hierarchical RPRs with links connected by Ethernet switches. It is a characteristic of a SET that it deals only with the MAC addressing of the equipment in attached directly to it via the Edge-PE and Core-PEs. Note that in the trivial case the SET is a point-to-point link that serves just one Edge-PE and one Core-PE. Again it should be appreciated that for the operation of the present invention the networks 180, 182, and 184 interconnecting Edge PEs and Core PEs can be any type of network that allows for the encapsulation of customer packets and where such encapsulation includes a field that can be identified as a virtual circuit label. For ease of description in the present disclosure the network between Edge-PEs and Core-PEs will be assumed to be a SET. It may be replaced mutatas mutandi by other types of network.

Coupled to each PE (logical or simple) are customer edge (CE) devices. Customer edge (CE) devices 140 and 142 are shown coupled directly to PE device 114. Customer edge (CE) devices 144 and 146 are coupled to the logical PE 130. Customer edge (CE) devices 148 and 150 are coupled to the logical PE 132. Customer edge (CE) devices 152 and 154 are coupled to the logical PE 134. For the realization of VPLS Service the link between customer edge (CE) and Edge-PE may be is a pure Ethernet link. Alternatively Ethernet packets may be multiplexed over either Layer 1 or Layer 2 technologies. One particular layer 2 multiplexing mechanism of importance is the use of 802.1Q VLAN tags as a method of separating customer traffic destined for different VPNs. Any multiplexing is purely a local matter that does not affect the operation of the present invention.

Each CE device is shown as the access point of a customer site to the network system that is providing virtual private network services. The CE device is the device through which traffic of a VPN at a particular site passes on its way to other sites of a VPN. VPLS service is the particular type of VPN under consideration for embodiments of the present invention. A CE device thus represents a site of a VPN.

Figure 3:
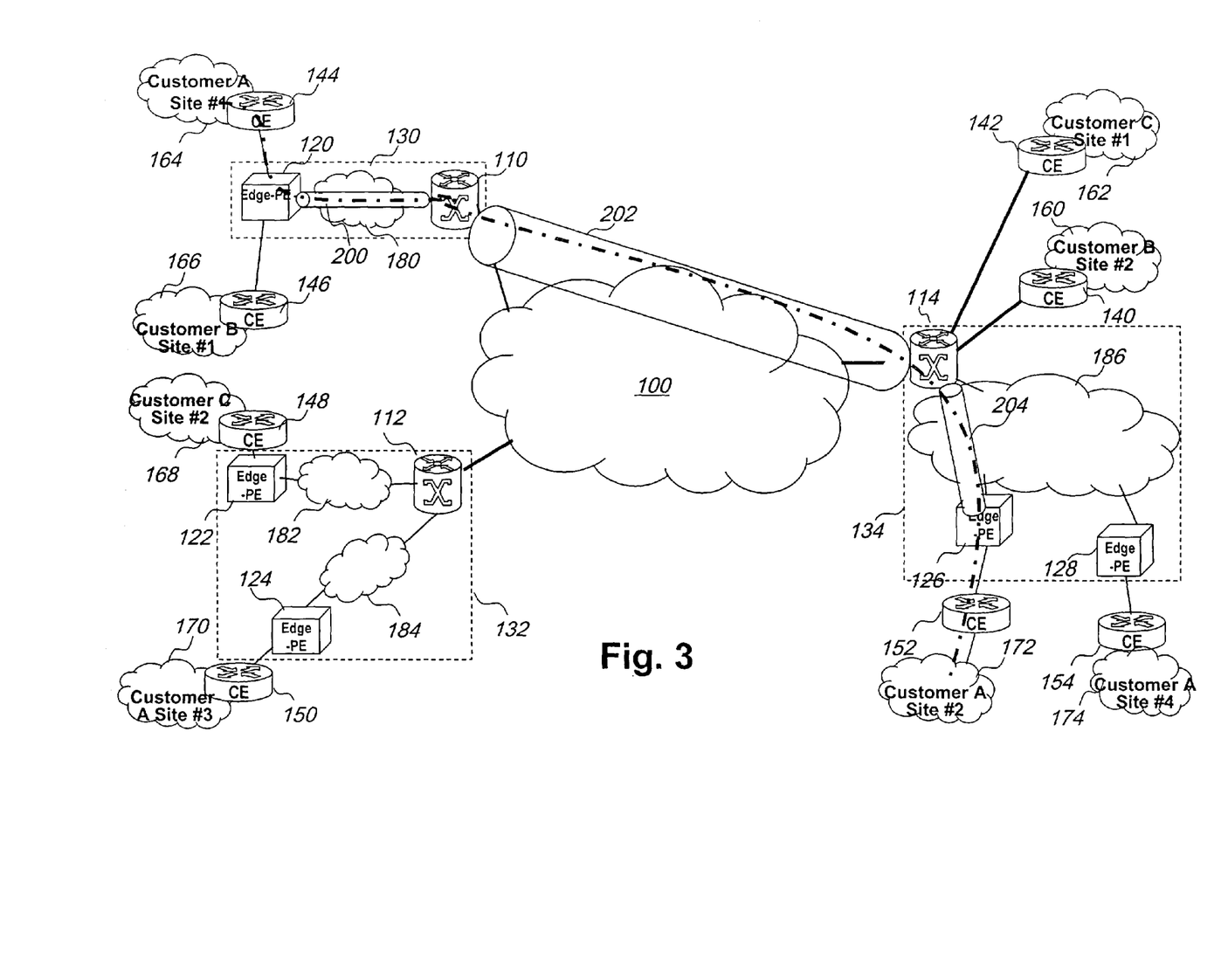
FIG. 3 illustrates a portion of the network of FIG. 2 showing interconnection of two VPN sites in accordance with an embodiment of the present invention.

In FIGS. 2 and 3, customer A has sites # 1, 2, 3, and 4 represented by clouds 164, 172, 170, and 114, respectively coupled via CE devices 144, 152, 150, and 154 respectively. Similarly Customer B has sites #1 and #2 represented by clouds 166 and 160 respectively coupled via CE devices 166 and 160, and customer C has sites # 1 and #2 represented by clouds 162 and 168 respectively coupled bia CE devices 142 and 148, respectively.

The LPE organization ties together a group of Edge PEs and one, or a small number, of Core PEs by interconnecting them with one or more SETs. Note that in the trivial case the SET is a point to point link that serves just one Edge PE and one Core PE. Other instances of SETs include, but are not restricted to, a resilient packet ring (RPR) as defined by the IEEE 802.17 committee and hierarchical RPRs with links connected by Ethernet switches. It is a characteristic of a SET that it deals only with the MAC addressing of the equipment in attached directly to it via the Edge PE and Core PEs.

Referring to FIG. 3, there is illustrated a portion of the network of FIG. 2 including an embodiment of the present invention. FIG. 3 depicts the path through the service providers network of a customer A's Ethernet packet between Customer A's site #1 164 and Customers A's site #2 172. The packet is confined to three tunnels 200, 202, and 2044 between Edge-PE 120 and Edge-PE 126. For the purposes of this embodiment of the present invention, a tunnel is restaged by encapsulating a customer Ethernet packet with a header that includes a VC label. Within a given scope a tunnel is identified by its VC label. Note that the term VC label refers to the innermost label in any MPLS label stack (it is a term from Martini's proposal). For example if the network 180 is a SET then before forwarding the packet over the Provider's metro network, the Edge-PE encapsulates the customer packet into another Ethernet frame and includes an label field in the encapsulation. For the purpose of simplifying the description, going forward, it is assumed that the label has the format of an MPLS label, but this is not strictly necessary for the operation of the LPE organization. Other embodiments of the invention could use IEEE 802.1 VLAN Tags, Layer 2 tunneling protocol (L2TP) session header, or even locally administered MAC addresses as labels.

In normal operation, the encapsulated packet from Customer A Site #1 164 is forwarded across the SET network to a carrier node called the Core-PE 114, via the tunnel 200. However it is a characteristic of the LPE approach that in the cases where the encapsulated customer packet is destined for another Edge-PE on the same SET, that the packet is not required to transit through the Core-PE, rather it is locally switched by the SET.

If however the encapsulated packet is destined for an Edge-PE and subsequent customer site, for example from site 164 to site 172, that is served by another Core-PE 114 then the packet has to be tunneled across the core network that interconnects Core-PEs, e.g. via tunnel 202. This Core network 100 could be an IP network using some form of tunneling such as GRE to carry customer Ethernet packets or it could be an MPLS network (as shown in FIG. 1) where there is established a full mesh of so-called transportation LSPs between all Core-PEs.

Regardless of whether the core realizes a transport network of LSPs or some form of IP tunnel individual customer packets carry a label (herein called the VC label but sometimes called the Service label) that serves to identify ultimately to which VPLS the customer packet belongs. In addition, in the Martinized DTLS scheme the label serves to identify which Edge-PE the packet originated from and which Edge-PE it should be forwarded to once it has traversed the Network Core and reached the egress Core-PE. Herein is described how to assign both the labels used in the SETs and the VC labels in the core so as to produce a VPLS mechanism that scales, is easy to operate and requires minimum functionality at the Edge-PEs.

Figure 4:
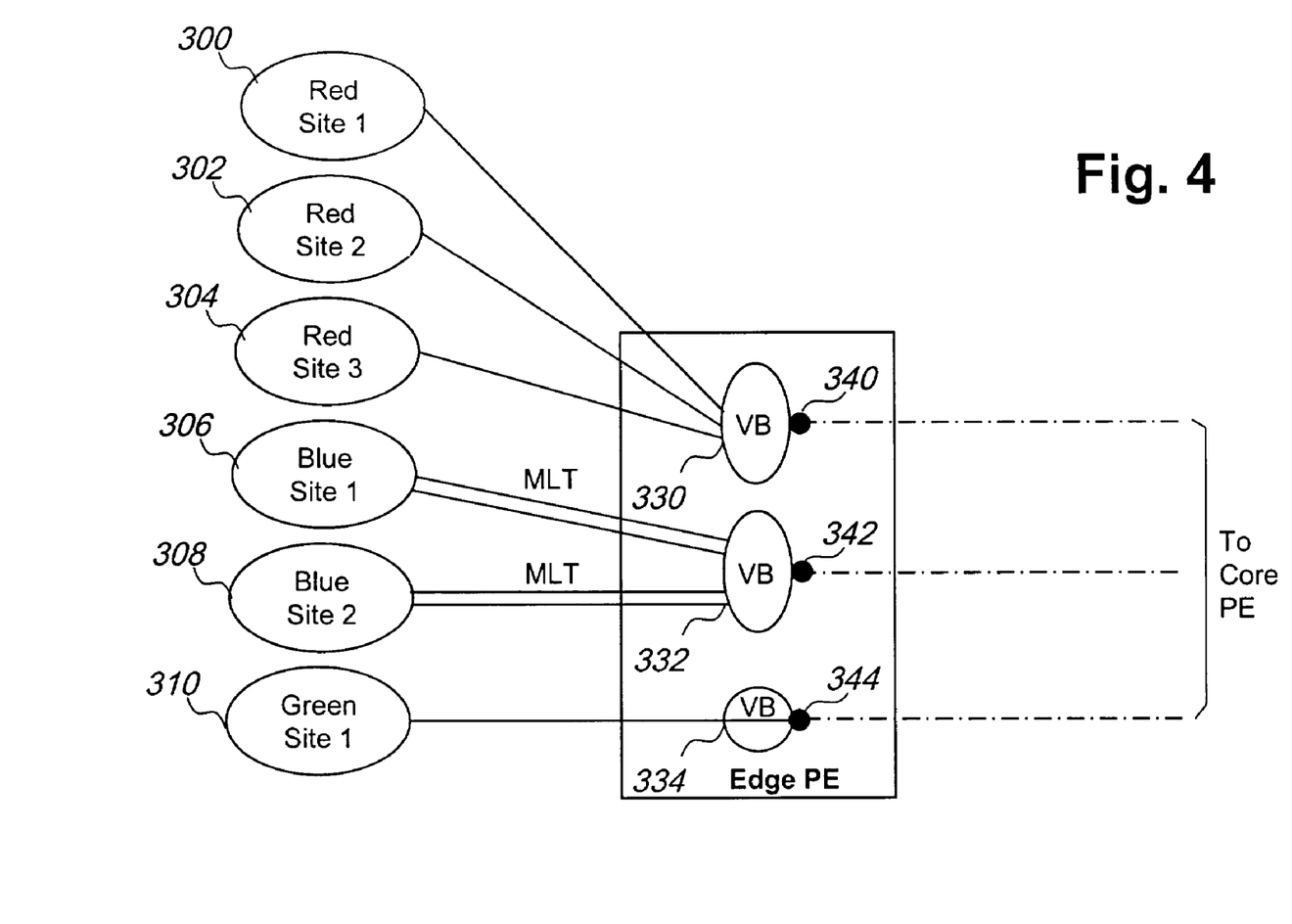
FIG. 4 illustrates virtual bridge ports provided in an Edge-PE.

It is a strict requirement of any VPN service that traffic from one customer be kept separate from traffic of other customers. When different customers traffic is being transported over a shared network being either the core network or the SET network the separation is maintained by assigning distinct VC labels to each customer's traffic. In the Edge-PE a separate context is maintained for each customer. For VPLS realization this context is a virtual bridge as depicted in FIG. 4. In many deployments of VPLS service it is likely that the service provider will be serving multiple CE's of the same customer from the same Edge-PE (e.g. a customer that has offices on the ground and $5^{th}$ floors). To operate correctly the Edge-PE has to be a bridge for this traffic, forwarding known unicast packets directly between the local sites of the same VPLS, (sometimes called Local Switching). Thus for each VPLS instance supported by an Edge-PE we have a virtual bridge and a virtual bridge port for traffic to and from the rest of the VPLS. The Diagram shows 3 virtual bridge ports, one for each VPLS supported (red, blue and green). These are logical ports, identified in some manner by encapsulation labels on the physical NNI port. In FIG. 4 is shown an Edge-PE 290 that provides a VPLS service for 3 customers Red, Blue and Green, that is it supports three virtual bridges (VBs) 330, 332, and 334 respectively. Notice that with the option of technologies such as multi-link trunking (MLT), on the one hand and the ability to multiplex traffic destined for different VPLSs onto a single Ethernet link (by use of 802.1Q VLAN tags) configured customer facing Ethernet ports (UNI ports) on an Edge-PE device need not be in 1-1 correspondence with Customer Sites. For example, FIG. 4 shows 6 sites and 8 UNI ports.

However it is a function of a virtual bridge to bridge together traffic from a potential plurality of sites that are members of the same VPLS attached to the Edge-PE. Thus each virtual bridge has a single logical port for traffic going towards the SET. 340 is the virtual bridge port for VB 330 through which all traffic from Red sites 300, 302 and 304 traverse. 342 is the virtual bridge port for virtual bridge 332, and 344 is the virtual bridge port for virtual bridge 334. In the case of VB 334 since there only one Green site to serve so there is not local bridging to perform.

Figure 5:
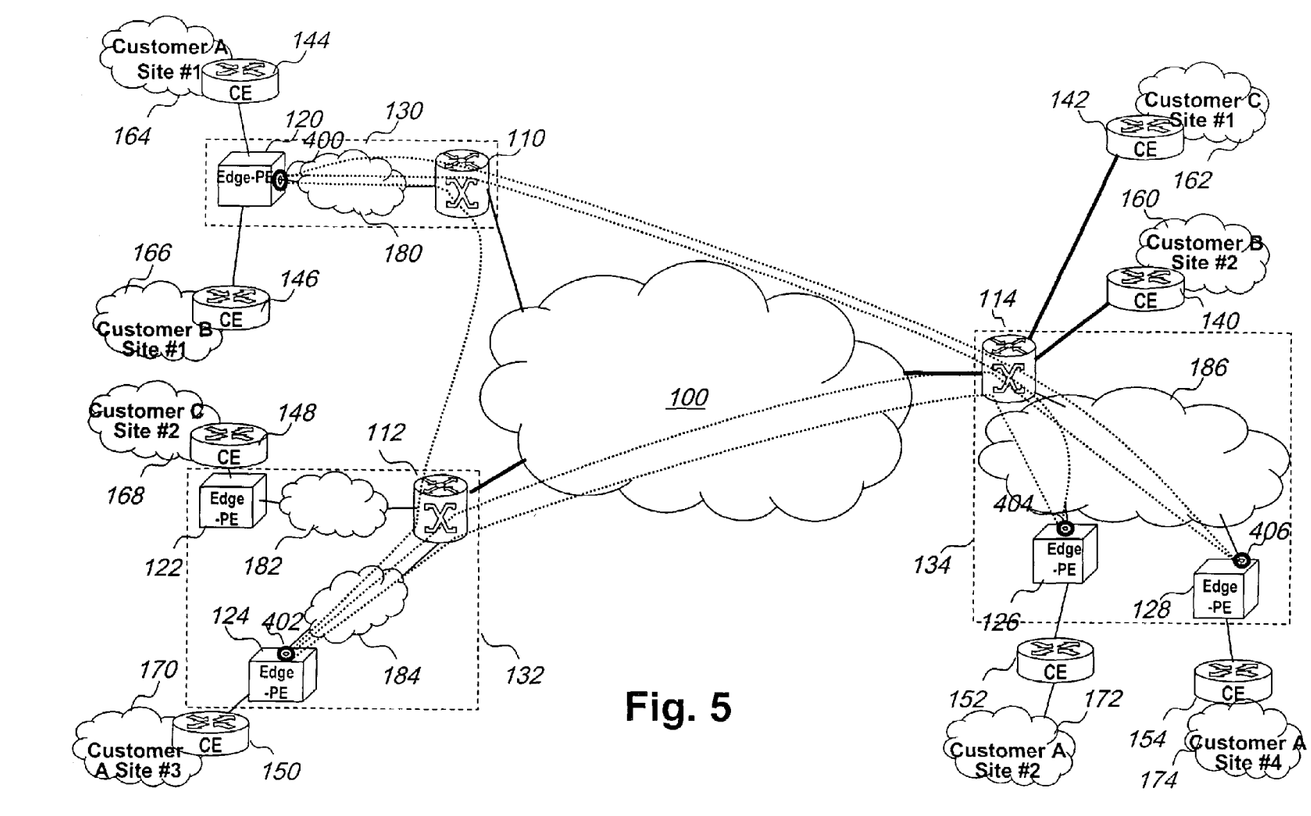
FIG. 5 illustrates a portion of a network showing a full mesh interconnection of Edge-PE.

In the embodiment of the present invention VPLS service is realized by a full mesh of VC tunnels between virtual bridge ports. Referring to FIG. 5, there is illustrated a portion of a network showing a full mesh interconnection of virtual bridge ports and hence virtual bridges for the VPLS service interconnecting the customer A sites 164, 170, 172, and 174. Each customer A site is served by virtual bridge ports 400, 402, 404, and 406 respectively. The VC tunnels interconnect the virtual bridges in a full mesh.

FIG. 5 shows only those tunnels that cross the core—a tunnel between virtual bridge ports 404 and 406 is not shown. Although there was no formal set up of "VC tunnels" in the SET, the number of VC tunnels that need to be set up in the core is the same as if there were, for each VPLS, a full mesh of VC tunnels between all Edge-PEs supporting that VPLS (see FIG. 5). For every VPLS it serves, each Edge-PE has a "tunnel" with all other Edge-PEs serving the same VPLS As shown in FIG. 3 each VC tunnel consists of 3 parts. Thus each direction of each VC tunnel can be thought of as a Label Switched Path of three segments. For the VC tunnels between virtual bridge port 400 and virtual bridge port 404 the three segments are from Ingress Edge-PE 120 to Ingress Core-PE 110, from Ingress Core-PE 110 to Egress Core-PE 114, and from Egress Core-PE 114 to Egress Edge-PE 126. Each segment has its own VC label, which is actually the SET label in the LPE parts of the network. In the embodiment of this invention the Core-PEs perform a label swapping operation on VC labels as packets traverse from the SET to the core and vice versa.

Each bi-directional VC tunnel is in fact identified by four VC labels in total. This is because it is desirable that the same label identifies both directions of a VC tunnel in a SET (i.e. between Edge-PE and Core-PE). This is to simplify that the Edge-PE MAC learning mechanism to basically learning the incoming Customer MAC source address in each received packet and associating it with SET VC label and the SET source MAC address. In the core there are separate VC labels in each direction of the VC tunnel since the allocation of labels for each direction is handled by each downstream Core-PE. The Core-PE is responsible for maintaining the mapping between SET label and VC label pair for each tunnel.

One goal of the embodiments of the present invention is to remove redundancy in identifiers and the like that have to be coded up consistently, provisioned consistently, maintained, and reported upon. Another goal is to ensure that an identifier is limited in scope as much as possible so that it does not have to be carried in messages between nodes across the network.

A described above a Virtual Bridge consists of a set of UNI ports that are locally connected to customer sites of the VPLS, together with learning bridge tables and a VBPort. The VBPort is the tunnel end point for all the "VC tunnels" originating/terminating on the Edge-PE for the respective VPLS. The Virtual Bridge is configured at first site provisioning and modified when there are changes affecting the connected sites.

The provisioning system has to be aware of what UNI ports exist on the Edge-PE and how they are to be assigned to VPLSs. No other entity of the embodiment knows or cares how many UNI ports there are in an Edge-PE, how they are assigned, or whether they are multiplexed ports or not.

Associated with each VPLS Context is an identifier called the Virtual Bridge Label Prefix (VBLabelPrefix). Each VPLS has a distinct VBLabelPrefix. It is unique within a SET but need not be unique on different Sets. VBLabelPrefix are deducible from the SET VC label of incoming packets. All packets forwarded through the VBport of a particular VB have the same VBLabelPrefix. It is used to identify to which VPLS context a packet incoming from the SET belongs.

In one embodiment of the present invention the VBLabelPrefix is assumed to be of variable length and is carried in packet encapsulations as the prefix parts (high order bits) of the SET label. It is provisioned in or signaled to the Edge-PE as an MPLS Label with the number of significant high order bits defined by a mask or prefix length, analogous to the way that IP address are partitioned into a subnet and host part. The VBLabelPrefix serves to identify the VPLS and hence VB that needs to handle the incoming packet in the Edge-PE. The low order bits are significant only to the Core-PE that allocated the SET label and they identify the VC tunnel across the core that the Ethernet packet arrived on or needs to be sent on. For local switching the SET label used is just the VBLabelPrefix, extended with all zeros, since each Edge PE will have a different Source MAC address.

Those skilled in the art will recognize that the above VBLabelPrefix embodiment is only one a number of mechanisms for partitioning a label space into two parts such that one part can be used to deduce which VB an incoming packet belongs to.

The VBLabelPrefix values are managed by the provisioning system (they may be generated by the Core-PE). Each Edge-PE is provisioned with the VBLabelPrefix (and VBMcstDA-see below) at the time of a VPLS context establishment. This will usually be when the first customer port for the VPLS at the Edge-PE is provisioned.

An alternative approach to the VBLabelPrefix embodiment is to have each Edge-PE allocate a separate SET MAC address to each VPLS context (which is then used by the Core-PE as the Destination Address of packets it forwards to the Edge-PE). In this case the Core-PE does not have to convey any label value prefix or range to the Edge-PE, but there still needs to be assigned a SET Ethernet Multi-cast address for the VPLS. Multi-cast must be used in this version for customer broadcast and unknown packets, since the multicast address is the only way of associating the right VPLS context for an incoming packet that is not individually addressed. This approach is not recommended however because it may result in hard to diagnose breeches in VPLS operation when a VB and its MAC address are reassigned to a new VPLS. It also likely relies on locally administered Ethernet MAC addresses which again carries extra administrative is tricky).

The other item associated with the VPLS Context is its Virtual Bridge (MAC) Multicast Destination Address, VBMcstDA. This is a MAC multicast address on the SET to be used as the destination for Broadcast and Unknown customer Ethernet packets. All Edge-PEs in a SET use the same VBMcstDA for the same VPLS (this address could be derived algorithmically from the VBLabelPrefix, alternatively it could be just the MAC Broadcast address, since the broadcast or unknown packet will have the VBLabelPrefix for the VPLS set in its encapsulation). The choice of type of VBMcstDA address (multicast or broadcast) is an engineering issue, depending on the SET and Edge-PE hardware capabilities.

Edge-PEs need to be provisioned and to report statistics. An Edge-PE can be provisioned directly from the management system or it can have all information proxied through a Core-PE. In the latter case, the different VPLS's contexts on the same Edge-PE could be served by different Core-PEs on the same or different SETS.

The information model of the Edge-PE is particularly simple. It needs to manage a number of VPLS contexts (VBs) each of which has associated with it a VBLabelPrefix and VBMcstDA to be used for all traffic on the SET. Configuration of the VBs is a purely local matter. Consequently, the Edge-PE does not have to have any knowledge of VPN-IDs, system wide unique identifiers of VPNs.

The Core-PE information model can be organized on a per VPLS basis, for each VPLS the Core-PE serves (over all directly connected SETS). The per VPLS information model is described below.

The VPLS needs to be identified by a VPN-ID, a globally unique, provisioned identifier. It is used in Core-PE auto-discovery, and VC label distribution signaling. In an embodiment of this invention the MPLS label distribution protocol (LDP) is used for VC label distribution between Core-PEs. As described above there is no need for any signaling of VC labels between Edge-PEs and the Core-PEs within an LPE.

The VPLS Peer Group is the list of all (other) Core-PEs that serve the particular VPLS. That is, there is at least one customer site attached to at least one Edge-PE that is connected by a SET to the Core-PE. In FIGS. 2, 3 and 5 the Peer Group for the Customer A VPLS is the Core-PEs 110, 112, and 114, while the Peer Group for the customer B VPLS is Core-PEs 110 and 114. The basic form of the VPLS Peer Group is a list of IP addresses but from that may be derived both transport tunnels and LDP sessions to be used to communicate with the peer Core-PEs.

The VPLS Peer Group may be determined by auto-discovery (based upon advertisement of the VPN-ID), from a directory or by provisioning. Auto-discovery may be done using VPN-IDs in LDP messages or by extensions to mBGP-4.

The Core-PE needs to generate or be assigned the VBLabelPrefix(es) for each VPLS it serves. The same VBLabelPrefix could be used across all the SETs in an LPE but for ultimate scalability a different VBLabelPrefix can be assigned for each SET that connects to the Core-PE.

The Core PE must know the Edge-PE MAC address (and SET i/f #) of all the VBs it serves. This table may be provisioned or learned.

The SET-to-Core (S2C) Label mapping table is used to swap a SET label to a VC label for packets from the Edge-PE, when they reach the Core-PE, before being forwarded on the core. Each entry refers to a different VC tunnel across the core. The entry also identifies the transport tunnel to be used (e.g. by containing the IP address to peer Core-PE). The offset of each entry in the SET-to-Core table can be used as the "tunnel-id" appended to the VBLabelPrefix to make up the SET Label (but how the label is made up is purely local matter for the Core-PE).

How S2C (and C2S) tables are maintained is described herein below.

The Core to SET label Mapping table is used to select the SET label to swap onto a packet arriving from the core and destined to the SET. Depending on how VC labels are generated (local to an interface or "global", i.e. across a platform) there may be one such table per transport tunnel or a single table in the Core-PE.

The following section lists the operation of an Edge-PE after provisioning has established the VB for a customer and the associated VBLabelPrefix and VBMcstDA.

When a customer packet arrives from edge (CE):
Identify VPLS context from UNI port assignment to VB
Learn customer MAC source address (SA) to UNI port mapping (local bridging).
Examine Customer MAC destination address (DA) in relation to VB MAC learning table.
If found to be a local bridging unicast, forward on appropriate UNI port.

If found to be a SET unicast, encapsulate with learned SET Provider SA=Edge-PE MAC address. (If there is no local bridging support then Provider SA is the "End Point" MAC address).

If found to be either a broadcast or unknown MAC packet then make copies for all other UNI ports in VB, plus encapsulate with base label (VBLabelPrefix plus all 0s) and forward on SET with provider DA VBMcstDA.

When packet arrives from SET
Identify VPLS context from label prefix
Learn customer SA mapping to both full SET label and provider SA
Look up customer DA and forward on appropriate port (or to all VB customer UNI ports if unknown or broadcast).

The following section lists the operation of a Core-PE after provisioning, auto-discovery and signaling have established the SET to Core (S2C) and Core to SET (C2S) label mapping tables for a VPLS When packet arrives from SET:
If it is a unicast packet (SET dest. MAC address is that of Core-PE and the SET label has a valid value in the low order bits) then use the SET label to index into the SET to Core (S2C) Label Mapping to retrieve the new label stack and outgoing core i/f. Swap service labels, add transport label and forward over the outgoing i/f currently associated with the transport LSP.

If broadcast/unknown (SET dest MAC address is multicast, lower order bits of SET Label is zero) then:
Identify the VPLS from the VBLabelPrefix
Step through all entries in the C2S with the same VBLabelPrefix, make a packet copy for each VC label and forward it over the associated transport LSP.

When packet arrives from MPLS Core:
Use the incoming VC label to look up a C2S Label Mapping Table. Obtain both a new service label and a SET dest. MAC address (DA) from the table.
Re-encapsulate the customer packet and forward over the SET, using the Core-PE MAC address as the SET SA.

Figure 6:
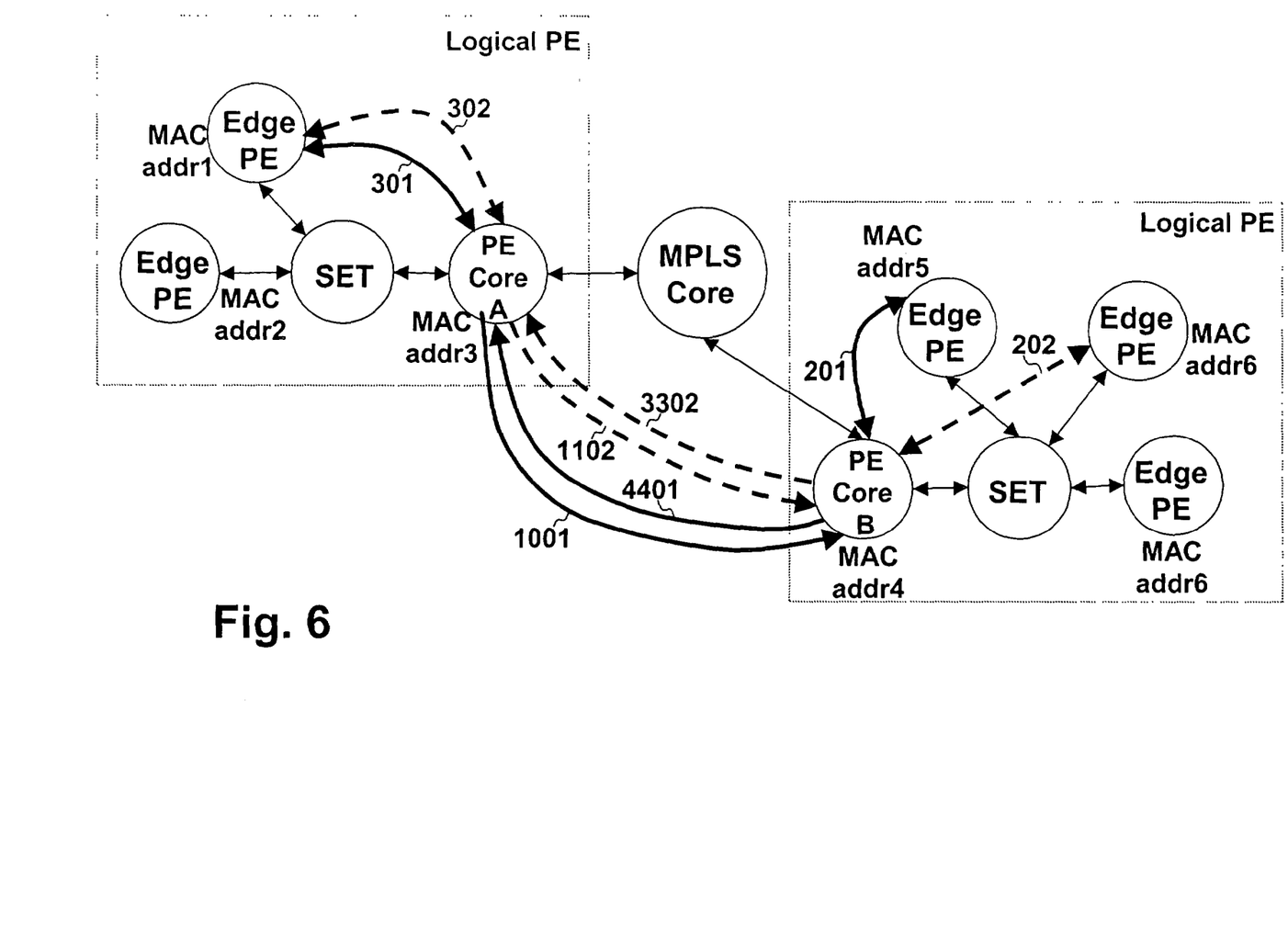
FIG. 6 illustrates an example portion of the VC labels assigned for a VPLS instance.

Referring to FIG. 6, there is illustrated an example of VPLS service. FIG. 6 and the following tables give the S2C and C2S label mapping tables for the simple 3 site VPLS service for the network shown in FIG. 3. This depicts customer sites attached to Edge-PEs with MAC addresses 1,5, and 6. Across the core there are two bi-directional VC tunnels. (The third leg of the full mesh is entirely with the right hand side SET).

| VC Label Forwarding Tables For Core PE A | | |
| --- | --- | --- |
| SET to Core (S2C) | | |
| 301 | 1001 | IPaddr Y |
| 302 | 1102 | IPaddr Y |
| Core to SET (C2S) | | |
| 4401 | 301 | MACaddr 1 |
| 3302 | 302 | MACaddr 1 |

| VC Label Forwarding Tables For Core PE B | | |
| --- | --- | --- |
| SET to Core (S2C) | | |
| 201 | 4401 | IPaddr X |
| 202 | 3302 | IPaddr X |

| VC Label Forwarding Tables For Core PE B | | |
| --- | --- | --- |
| Core to SET (C2S) | | |
| 1001 | 201 | MACaddr 5 |
| 1102 | 202 | MACaddr 6 |

The following section describes the actions when new customer sites are added to a VPLS.

The preliminary action when a new VB is added to a VPLS is to establish the VC tunnels across the core for the traffic between it and all other VBs (except those in the same SET, which are reached by local switching). Thus if there are n "inter-SET" VBs already established when the n+1$^{th}$ is provisioned the Core-PE serving that VB must instigate the establishment of n bi-directional "VC" tunnels—each of which consists of two uni-directional LSPs, one in each direction. To make the match up between each direction of the "VC" tunnel a form of attachment identifiers is used.

An attachment identifier is a locally generated identifier, advertised to all other Core-PEs servicing the same VPLS. There is one Attachment ID per VB (It could be generated simply as the index in the Core-PE's VB Table).

When a Core-PE offers another Core-PE a VC label in an LDP message it includes both the VPN-ID and source and target attachment identifiers (SAI and TAI respectively). The SAI is the locally generated Attachment ID for the Core-PE offering the label, while the TAI is an attachment identifier advertised by the peer Core-PE. The tunnel VC pair consists of the label offered with a particular SAI and TAI in one direction and the label offered with the reverse/swapped SAI/TAI in the other direction.

The following section describes the mechanism when the first site of a VPLS is provisioned at a particular Core-PE. The Core-PE recognizes that the VPN-ID is not that of a VPLS it is already serving. The Core-PE assigns (or is told by the provisioning system a VBLabelPrefix for use between it and the Edge-PE on which the new VB table and a S2C *sub) table and C2S (sub) table.

The Core-PE "joins" the VPLS Peer Group. Through some discovery method it acquires a list of VPLS Peer Group members together with their current attachment identifiers (one for each of the VPLS virtual bridges (VB) that they currently serve).

The rest of the action the Core-PE takes is the same as when a new VB is added to existing groups of VBs for a VPLS that the Core-PE already serves.

Assume that there is an established VPLS and then a new customer site is added to an Edge-PE that did not serve that VPLS before. Assume in this case that there is another Edge-PEs subtending to the same Core-PE that has a site of the VPLS attached to it. The actions are as follows:

The Core-PE, on being notified (by say a management system) of the addition sends the new Edge-PE the VBLabelPrefix for the VB.

The Core-PE generates an SAI for the VB. For each peer Core-PE in the VPLS Peer Group it generates a VC label for each of the TAIs (of the particular VPLS) that the peer Core-PE has advertised and offers that label to the peer Core-PE. With LDP DU and FEC element includes the VPN-ID and SAI and TAI. The label offered can have any value not currently being used by the Core-PE. (Under certain assumptions, and using LDP, the label needs only be unique to the particular MPLS port that will receive the VC tunnel from the far end).

At the same time, for each label offered, the Core-PE creates a new SET label with the fixed VBLabelPrefix and unique lower order. The Core-PE associates that label with the label offered, in the C2S Label Mapping Table. This table establishes the label swap to be performed when an encapsulated packet arrives from the core and is to be sent out on the SET.

When each of the peer Core-PEs receives a label it allocates it to the VB that it had associated with the TAI included in the FEC element. It generates a SET label (with the VBLabelPrefix it has used for the particular VPLS). It enters the offered label and the newly generated SET label into its S2C table (this table establishes the VC Label swap to be performed when an encapsulated packet arrives on the SET to be forwarded across the core). Note that there is no communication of new SET labels to the relevant Edge-PEs—the labels will just appear in packets to be learnt in the normal Ethernet fashion described above.

The arrival of a new attachment identifier (the SAI) can be learnt by all the peer Core-PEs as a new TAI to be stored against the originating Core-PE.

For each of those of its own VBs for which it has been offered a VC label, the peer Core-PEs generates a VC label to be used for the other direction of the VC tunnel. It then puts the association of this new label and the SET label to the original Core-PE. The FEC this time has the value of the TAI and SAI swapped.

Finally, when the original Core-PE receives back the labels that complete each VC Tunnel, it enters each such label and the SET label associated with the particular VC tunnel into its S2C table. This completes the establishment of all the "extended" VC tunnels from the new Edge-PE to all other Edge-PEs (without it should be noted any involvement of the Edge-PEs-so called single ended provisioning)

The learning step of recognizing a new attachment identifier helps guard against race conditions. Each Core-PE should ensure that it has offered a VC label for each SAI it has to every TAI that it knows about. The removal of a VC label should be cause to remove all labels associated with the SAI (it means that a VB is no longer present).

What is claimed is:

1. A method for providing virtual private LAN segment (VPLS) service in a network comprising a core network and a plurality of logical provider edges (LPEs), the method comprising the steps of:
    establishing a full mesh of tunnels between a second plurality of Edge-PEs, each of the second plurality of Edge-PEs having at least one customer site attached thereto, the customer sites being members of a VPLS; each of the second plurality of Edge-PEs further being part of one of the plurality of LPEs; each of the plurality of LPEs having at least one Core-PE, forming a third plurality of Core-PEs; each of the full mesh of tunnels comprising:
        a first tunnel segment between a first Edge-PE and a first Core-PE of a first LPE,
        a second tunnel segment between the first Core-PE and a second Core-PE, the second tunnel segment traversing the core network, and
        a third tunnel segment between the second Core-PE and a second Edge-PE of a second LPE;
    receiving at the first Edge-PE, a customer LAN packet from a first customer site having a source address associated with the first customer site and a destination address associated with a second customer site;
    encapsulating the customer LAN packet with a first label at the first Edge-PE, the first label being indicative of the first tunnel segment;
    forwarding the customer LAN packet on the first tunnel segment to the first Core-PE;
    swapping the first label for a second label associated with the second tunnel segment at the first Core-PE;
    forwarding the customer LAN packet on the second tunnel segment to the second Core-PE;
    swapping the second label for a third label associated with the third tunnel segment at the second Core-PE; and
    forwarding the customer LAN packet on the third tunnel segment to the second Edge-PE;
    examining the destination address and forwarding to a customer port at the second Edge-PE.

2. The method as claimed in claim 1, further comprising the steps of:
    notifying the first Core-PE the identity of the VPLS and an address of the first Edge-PE associated therewith;
    generating at the first Core-PE an identifier for inclusion in the first label associated with the first tunnel segment.
    building at the first Edge-PE a first association table for associating the identifier with a port, the port connected to a customer sits of the VPLS.

3. The method as claimed in claim 2, wherein the identifier is exclusive in the first LPE to the labels associated with all tunnel segments between the first Edge-PE and the Core-PE.

4. The method as claimed in claim 2, further comprising the step of associating the identifier with a broadcast label for encapsulating multicast or unknown customer LAN packets at the first Edge-PE.

5. The method as claimed in claim 2, wherein a first group of Edge-PEs of the VPLS is connected to the first Core-PE and a second group of Edge-PEs of the VPLS is connected to the second Core-PE, and wherein the first label is an LPE label, the second label is a core label, further comprising the steps of:
    establishing a fourth plurality of core tunnel segments between the first Core-PE and the second Core-PE, the fourth plurality being the product of the number of Edge PEs in the first group times the number of Edge PEs in the second group;
    associating core labels for each of the fourth plurality of core tunnel segments, the core labels comprising a first core label and a second core label
    generating at the first Core-PE distinct LPE labels, one for each of the fourth plurality of core tunnel segments;
    building a second association table at the first Core-PE for mapping each LPE label to an associated first core label; and
    building a third association table at the first Core-PE for mapping each second core label to an associated LPE label.

6. The method as claimed in claim 5, further comprising the step of participating in an auto-discovery protocol exchange by the first Core-PE to learn the address of every other member of the third plurality of Core-PEs.

7. The method as claimed in claim 5, further comprising the step of provisioning in the first Core-PE the address of every other member of the third plurality of Core-PEs.

8. The method as claimed in claim 5, wherein the customer LAN packet received at the first Edge-PE is multicast or unknown customer LAN packet, further comprising the steps of
  encapsulating the customer LAN packet with the broadcast label at the first Edge-PE;
  transmitting copies of the customer LAN packet from the first Core-PE, on every core tunnel associated with the identifier in the customer LAN packet label, each transmitted copy being encapsulated with the second label for the core tunnels;
  determining at each of the Core-PEs for encapsulating the customer LAN packet for the third tunnel, based on the second label;
  forwards customer LAN packet on the third tunnel;
  examining the source address of the customer LAN packet,
  learning an association between the source address and the label in the customer LAN packet at the second Edge-PE; and
  extracting the identifier from the customer LAN packet to determine a customer port on the second Edge-PE for forwarding a second customer LAN packet in the direction from the second Edge-PE to the first Edge-PE.

9. The method as claimed in claim 5, wherein an endpoint of the first tunnel in the first Edge-PE is associated with the destination address of the customer LAN packet and The first label is a learnt label, further comprising the steps of:
  encapsulating the customer LAN packet with the learnt label at the first Edge-PE;
  determining the third label for encapsulating the customer LAN packet for the third tunnel based on the second label, at the second Core-PE; and
  examining the source address of the customer LAN packet,
  learning an association between the source address and the label in the customer LAN packet at the second Edge-PE; end
  extracting the identifier from the customer LAN packet to determine a customer port on The second Edge-PE for forwarding a second customer LAN packet in the direction from the second Edge-PE to the first Edge-PE.

10. The method as claimed in claim 1, wherein an end point of the first tunnel is a virtual port of a Virtual Bridge bridging the customer LAN packet from the at least one customer site, the virtual bridge defined by a context of the VPLS, further comprising the step of directly forwarding the customer LAN packet destined to a second customer site connected to the first Edge-PE.

11. The method as claimed in claim 4, wherein a switched Ethernet transport (SET) provides layer 2 transport between the Edge-PE and the Core-PE and between Edge-PEs within an LPE and wherein the customer LAN packet received at the first Edge-PE is multicast or unknown customer LAN packet, further comprising the steps of:
  encapsulating the customer LAN packet with the broadcast label at the first Edge-PE;
  broadcasting the encapsulated packet to all Edge-PEs and Core-PEs in the LPE;
  receiving the encapsulated customer LAN packet at a third Edge-PE;
  examining the broadcast label to determine the customer LAN packet being part of the VPLS;
  examining the source address of the customer LAN packet,
  learning an association between the source address of the customer LAN packet and the address of the first Edge-PE, the address of the first Edge-PE being the source address of encapsulating packet;
  extracting the identifier from the customer LAN packet to determine a customer port on the second Edge-PE for forwarding a second customer LAN packet in the direction from the second Edge-PE to the first Edge-PE.

12. The method as claimed in claim 5 wherein the core network is a multi-protocol label switching (MPLS) transport network, and the second label is transported as the innermost or a VC label of an MPLS packet and the step of establishing a third plurality of core tunnel segments further comprises the step of:
  communicating with the second Core-PE by the first Core-PE using the Label Distribution Protocol (LDP) to agree on the label value for a core tunnel segment for MPLS encapsulated packets travelling from the first Core-PE to the second Core-PE.

13. The method as claimed in claim 12 wherein the second Core-PE initiates the LDP exchange towards the first Core-PE to agree on the second core label used in the third association table of the first PE and for MPLS encapsulated packets travelling in the direction from the second Core-PE to the first Core-PE.

14. The method as claimed in claim 1 wherein the first, second and third labels comprise information carried in the encapsulation of packets, and wherein the information in the third label is used by the second Edge-PE to generate the first label for LAN packets being transported as part of the same VPLS in the direction from the second Edge-PE to the first Edge-PE.

15. The method as claimed in claim 1 further comprising the steps of forwarding reverse LAN packets in a direction from the second Edge-PE to the first Edge-PE; wherein the third label is associated with a tunnel from the second Edge-PE to the second Core-PE, and the first label is associated with the tunnel from first Core-PE to first Edge-PE.

16. The method as claimed in claim 10 further comprising the step of storing an actual label of the customer LAN packet arriving on the virtual port as part of a table associating egress port with learned customer MAC address.

17. The method as claimed in claim 2, wherein the identifier is Virtual Bridge Label Prefix (VBLabel Prefix) and is a first part of the first label.

18. The method as claimed in claim 17 where the first label further comprises a second part for serving at the first Core-PE as an index into the second association table for the second label for the second tunnel.

19. The method as claimed in claim 18 wherein the identifier is a set of higher order bits and the second part is a set of lower order bits, further comprising the steps of interpreting the identifier as an reference for a virtual bridge of the context of the VPLS by the first Edge-PE, and interpreting the second part as a reference to the second tunnel between the first Core-PE and the second Core-PE.

20. A method for providing virtual private LAN segment (VPLS) service in a network comprising a core network and a plurality of logical provider edges (LPEs), the method comprising the steps of:
  establishing a tunnel an Edge-PE having at least one customer site attached thereto, the customer sites being members of a VPLS; the Edge-PE being part of an LPE having a first Core-PE, the tunnel comprising:

a first tunnel segment between the Edge-PE and the first Core-PE, and a second tunnel segment between the first Core-PE and a second Core-PE, the second tunnel traversing the core network;

receiving at the Edge-PE, a customer LAN packet from a customer site having a source address associated with the customer site and a destination address;

encapsulating the customer LAN packet with a first label at the Edge-PE, the first label being indicative of the first tunnel segment;

forwarding the customer LAN packet on the first tunnel segment to the first Core-PE;

swapping The first label for a second label associated with the second tunnel segment at the first Core-PE; and forwarding the customer LAN packet on the second tunnel segment to the second Core-PE.

21. The method as claimed in claim 11 wherein the broadcast destination of the encapsulated customer LAN packet is confined to only those Edge-PEs that serve customer sites of the VPLS, further comprising the steps of:

generating an Ethernet multicast address and associating it with the VLPS;

configuring a network hardware of the Core-PE and only those Edge-PE which serve the same VPLS to receive packets with the multicast address;

using the multicast address as the destination address for encapsulated broadcast and unknown Customer packets.

22. The method as claimed in claim 3, wherein a switched Ethernet transport (SET) provides a layer 2 transport between the Edge-PE and the Core-PE and between Edge-PEs within an LPE and wherein the first Edge-PE has learnt an association of the destination address of the customer LAN packet with the address of a third Edge-PE in the same LPE as itself, further comprising the steps of:

encapsulating the customer LAN packet with the broadcast label at the first Edge-PE;

transmitting the packet over the SET with the learned address of the third Edge-PE as the encapsulating packet's destination address learning an association between the source address source address of the customer LAN packet and the source address of the first Edge-PE, being the source address or the encapsulating packet.

* * * * *

UNITED STATES PATENT AND TRADEMARK OFFICE
CERTIFICATE OF CORRECTION

PATENT NO. : 7,260,097 B2
APPLICATION NO. : 10/265621
DATED : August 21, 2007
INVENTOR(S) : Liam Casey It is certified that error appears in the above-identified patent and that said Letters Patent is hereby corrected as shown below:

Column 6, line 45: Delete "A" and insert --As--.

Column 12, line 29: Delete "sits" and insert --site--.

Column 13, line 28: Delete "The" and insert --the--.

Column 13, line 39: Delete "end" and insert --and--.

Column 13, line 41: Delete "The" and insert --the--.

Column 14, line 46: Delete "(VBLabel Prefix)" and insert --(VBLabelPrefix)--.

Column 15, line 14: Delete "The" and insert --the--.

Column 16, line 19: Delete "source address".

Signed and Sealed this

Twenty-seventh Day of May, 2008

JON W. DUDAS
*Director of the United States Patent and Trademark Office*